United States Patent
Sharif et al.

(10) Patent No.: US 10,059,293 B2
(45) Date of Patent: Aug. 28, 2018

(54) STRUCTURE FOR POSITIONING A TRIM COMPONENT ON A VEHICLE

(71) Applicant: Ford Global Technologies, LLC, Dearborn, MI (US)

(72) Inventors: Irfan Sharif, Canton, MI (US); Joseph A Hickey, Rochester Hills, MI (US); Michael Williams, Northville, MI (US); Flondezi Godette, Saline, MI (US); Michael Jon Gutowski, Ypsilanti, MI (US); Robert T Babcock, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/509,286

(22) Filed: Oct. 8, 2014

(65) Prior Publication Data

US 2016/0101755 A1    Apr. 14, 2016

(51) Int. Cl.
*B60R 19/52* (2006.01)

(52) U.S. Cl.
CPC ........ *B60R 19/52* (2013.01); *B60R 2019/525* (2013.01)

(58) Field of Classification Search
CPC .................. B60R 19/52; B60R 2019/525
USPC ....................................... 296/193.1
See application file for complete search history.

(56) References Cited

U.S. PATENT DOCUMENTS

| | | | |
|---|---|---|---|
| 2,566,605 A | 9/1951 | Ekornaas | |
| 4,196,774 A * | 4/1980 | Hoffmann | 165/67 |
| 4,593,441 A * | 6/1986 | St. Louis | 24/297 |
| 5,141,282 A | 8/1992 | Fujiwara | |
| 5,403,048 A | 4/1995 | Ekladyous et al. | |
| 6,027,150 A | 2/2000 | Flewitt et al. | |
| 6,167,645 B1 * | 1/2001 | Gasko et al. | 40/200 |
| 6,422,643 B1 | 7/2002 | Pease | |
| 6,581,252 B1 * | 6/2003 | Sedlock et al. | 24/297 |
| 6,592,164 B2 * | 7/2003 | Nagae et al. | 296/29 |
| 8,434,809 B2 * | 5/2013 | Young et al. | 296/70 |
| 2008/0157563 A1 * | 7/2008 | Crane et al. | 296/187.01 |
| 2009/0153314 A1 * | 6/2009 | Young et al. | 340/438 |
| 2011/0204680 A1 * | 8/2011 | Fortin | 296/193.1 |

(Continued)

FOREIGN PATENT DOCUMENTS

| | | |
|---|---|---|
| DE | 3617962 A1 | 12/1987 |
| DE | 20314107 U1 | 1/2004 |

(Continued)

OTHER PUBLICATIONS

Machine translation of JP 04090927.*

(Continued)

*Primary Examiner* — Hilary L Gutman
(74) *Attorney, Agent, or Firm* — Jason Rogers; Burgess Law Office PLLC

(57) ABSTRACT

A component positioning device including at least one resilient structure that centers the component. For example, a spring that acts between a grille and a grille opening to center the grille within a grille opening. The spring generating a reaction force sufficient to self-adjust the grille within the grille opening wherein opposing springs are deployed on either side of the grill with the springs exerting a force on and moving the grill until the force exerted by the opposing springs reaches equilibrium.

6 Claims, 6 Drawing Sheets

(56) References Cited

U.S. PATENT DOCUMENTS

2014/0059859 A1* 3/2014 Townson et al. ............ 29/897.2
2014/0062140 A1* 3/2014 Townson et al. ........ 296/193.09
2014/0208602 A1* 7/2014 Townson et al. .............. 33/600

FOREIGN PATENT DOCUMENTS

| DE | 10217160 A1 | 3/2004 |
| DE | 10337545 A1 | 3/2005 |
| DE | 102008039803 A1 | 2/2010 |
| JP | 04090927 A * | 3/1992 |

OTHER PUBLICATIONS http://www.bing.com/search?q=define%3A+rib&src=IE-SearchBox&FORM=IESR02 Definition of "rib", accessed Mar. 6, 2017.*

Socha, LB; "Trends in Vehicle Aerodynamic Improvements and Their Effect on Performance and Fuel Economy", Published in HS-805 233 (TRIS 361554), "International Automotive Fuel Economy Research Conference (1st) Proceedings," Washington, D.C., 1980, pp. 235-245. Conference held Oct. 31-Nov. 2, 1979.

* cited by examiner

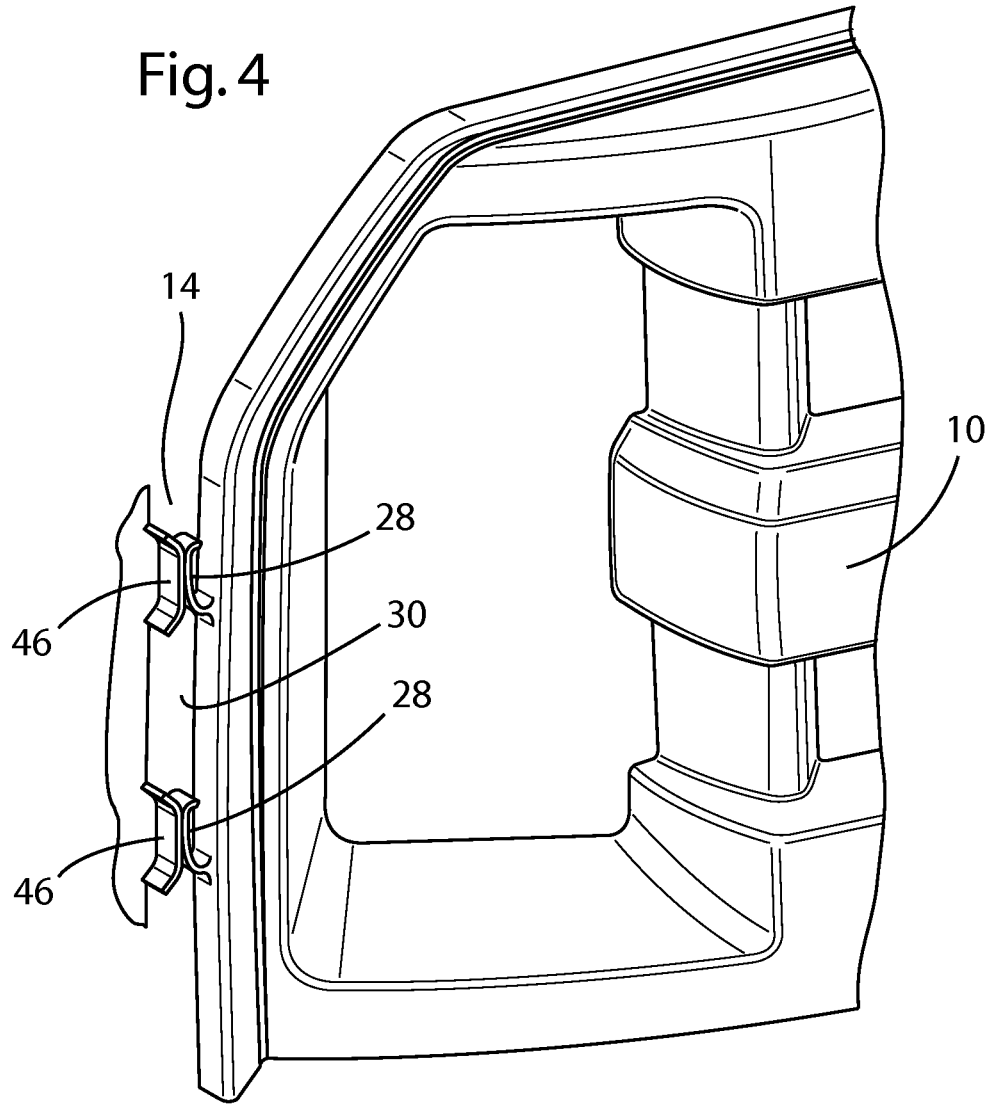

STRUCTURE FOR POSITIONING A TRIM COMPONENT ON A VEHICLE

CROSS-REFERENCE TO RELATED APPLICATIONS

Not applicable

BACKGROUND OF THE INVENTION

1. Field of the Invention

The present invention relates generally to a system for positioning a trim component or other part on a vehicle; and, more specifically, to a structure for positioning a grille on a vehicle.

2. Description of Related Art

Modern vehicle manufacturers incorporate a grille on the front end of the vehicle. The grille covers an opening at the front of the vehicle allowing air flow to the radiator aiding in its function of cooling the engine. Grille design integrates both functionality and style. Modern grilles include an elegant, distinctive or authentic look, giving the vehicle a distinct visual appeal that sets it apart from similar vehicle makes and models on the road.

Typically, the grille attaches to the vehicle structure between the vehicle headlights. Given that fit and finish for vehicles is a key deliverable for overall craftsmanship of the vehicle, emphasis is placed on the headlight/grille margins. In some instances, front end parts and build tolerances result in uneven margin or gap between the grille and headlights. For example, a vehicle could have a tight margin on one side and a wide margin on the other. Regardless of the size of the margin, customers demand even and parallel margins on both sides of the grille.

Manually adjusting the grille to center and equalizing the margin or gap on either side of the grille, after the vehicle reaches the end of the assembly line, i.e., after building the vehicle, is one way to center a grille and achieve a desired look. However, on high volume vehicles, it is not practical to manually adjust the grille as this is a labor intensive and expensive process. In some instances, assembly operators at the end of line would have to uninstall parts such as air deflectors, beauty shields, hood seals etc., to get to the grille fasteners or attachments. Further, since the grille is a decorative part, there is the potential of damage during the adjustment.

SUMMARY OF THE INVENTION

An embodiment of the present invention provides a positioning device including resilient structures that positions the component. The resilient structures exert an equal and opposite force on respective reaction surfaces. The respective forces resulting in movement between adjacent resilient structures and reaction surfaces until the resilient structure forces reach equilibrium. For example, when the component is a grille placed between headlamps, the resilient structures may include springs that act between the grille and the headlamps to center the grille in the space between headlamps. Each spring acting against a respective reaction surface and generating a reaction force. The reaction forces operate to move the grill until the force exerted by opposing springs reaches equilibrium and correspondingly self-adjusting the grille within the grille opening or the space between headlamps.

In one embodiment, the springs are integrated into the grille making the assembly process unchanged for the operator. A further embodiment includes the springs being small cantilever beams deployed from the side of the grille with some interference to the reaction surface located on or adjacent the grille opening.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is an enlarged partial perspective view of the grille attachment structure engaged with a portion of the vehicle.

DETAILED DESCRIPTION OF THE PREFERRED EMBODIMENTS

The following description of the preferred embodiment(s) is merely exemplary in nature and is in no way intended to limit the invention, its application, or uses.

Figure 1:
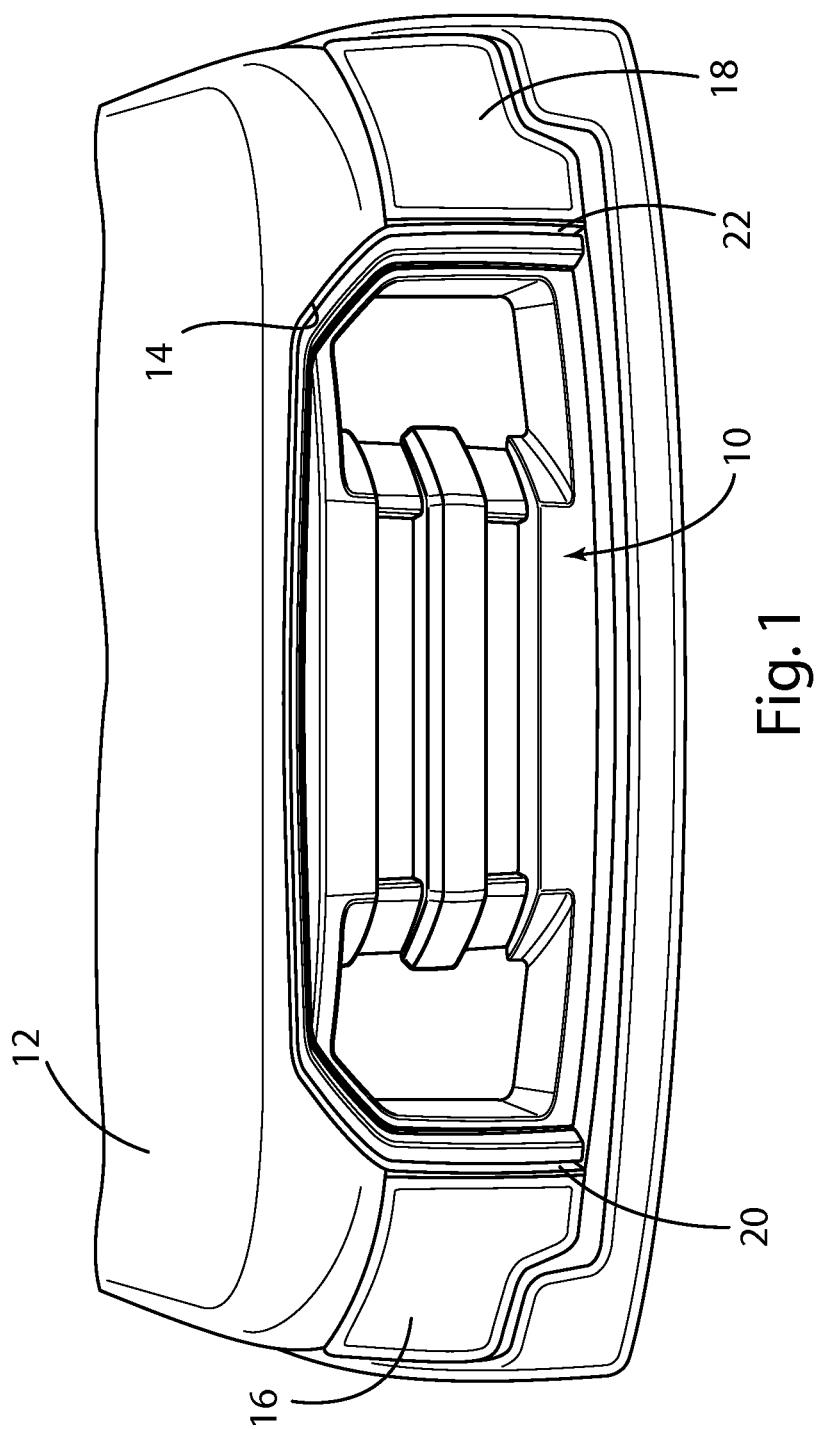
FIG. 1 is a perspective view of a vehicle including a grille attachment structure according to an embodiment of the present invention

FIG. 1 illustrates a grille, seen generally at 10, for an automotive vehicle 12. The vehicle 12 includes a grille opening 14 located in the front end of the vehicle 12 between the headlights 16, 18. This is for illustration purposes only, as the grille opening 14 may be located in various positions on the front end structure of the vehicle 12 or between various trim or body components. For example, the grille opening 14 may not extend from the first headlight 16 to the second headlight 18. Instead, it may extend between trim components (not shown) attached to the front end structure of the vehicle and positioned adjacent the headlights 16, 18.

Due to the respective build tolerances in the various parts or components of the front end structure and the grille 10 there is a margin or gap 20, 22 between the grille 10 and the vehicle 12, in the present example the headlights 16, 18, when the grille 10 is placed in the grille opening 14. During installation the margin or gap 20, 22 can become uneven causing an aesthetically unpleasing appearance. For example, the vehicle 12 could have a tight margin or small gap on one side and a wide margin or large gap on the other side.

Figure 2:
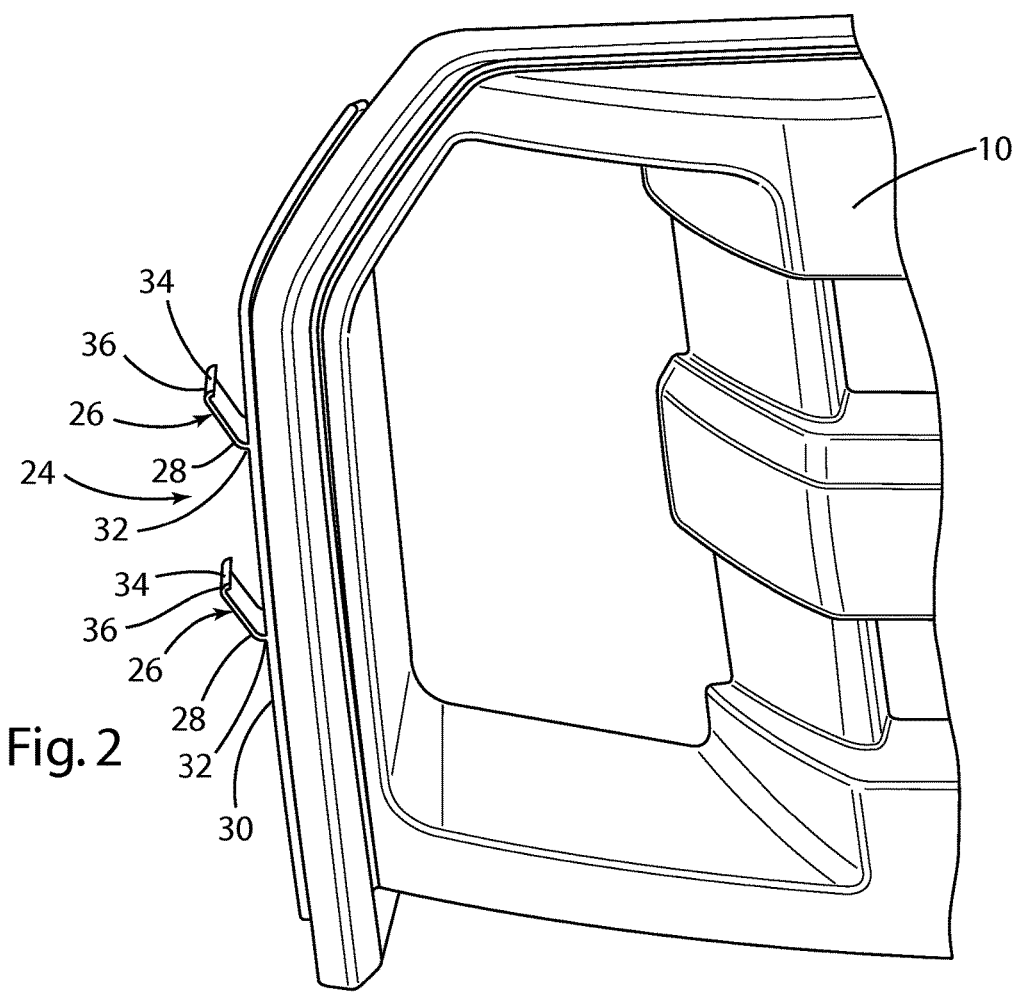
FIG. 2 is a partial front perspective view of a grille and grille attachment structure according to the present invention

FIG. 2 illustrates the grille 10 including a grille centering structure, seen generally at 24, the grille centering structure 24 operates to center the grill 10 in the grille opening 14 such that the margin or gaps 20, 22 are even and uniform. One embodiment of the grille centering structure 24 includes a resilient structure, for example a spring-like mechanism or member 26 that centers the grille 10 in the grille opening 14. One example of a spring-like mechanism 26 is a cantilever member 28 shown attached to a structural member, including a sidewall 30 of the grille 10. In the present example, the grille 10 includes an integrally molded cantilever member 28; however, either the cantilever member 28 or the spring-like mechanism 26 may be formed separate from and attached to the grille 10. For example, the cantilevered member 28 or spring like mechanism 26 may include a clip or attachment feature used to attach it to the grille 10.

As illustrated, a proximal end 32 of the cantilever member 28 attaches to the sidewall 30 of the grille 10. The distal or free end 34 extends outwardly and is spaced from the sidewall 30. The distal or free end 34 includes an arcuate surface 36. The cantilever member 28 has a spring stiffness that depends on the geometry of the member and the material stiffness of the member, with the ratio of force and deflection referred to as the stiffness of the member. In the disclosed example, the cantilevered member 28 has a generally rectangular cross-section having rounded edges. Cross sectional shape and edge style of the member 28 can play an important role in spring stiffness of the member 28.

Figure 3:
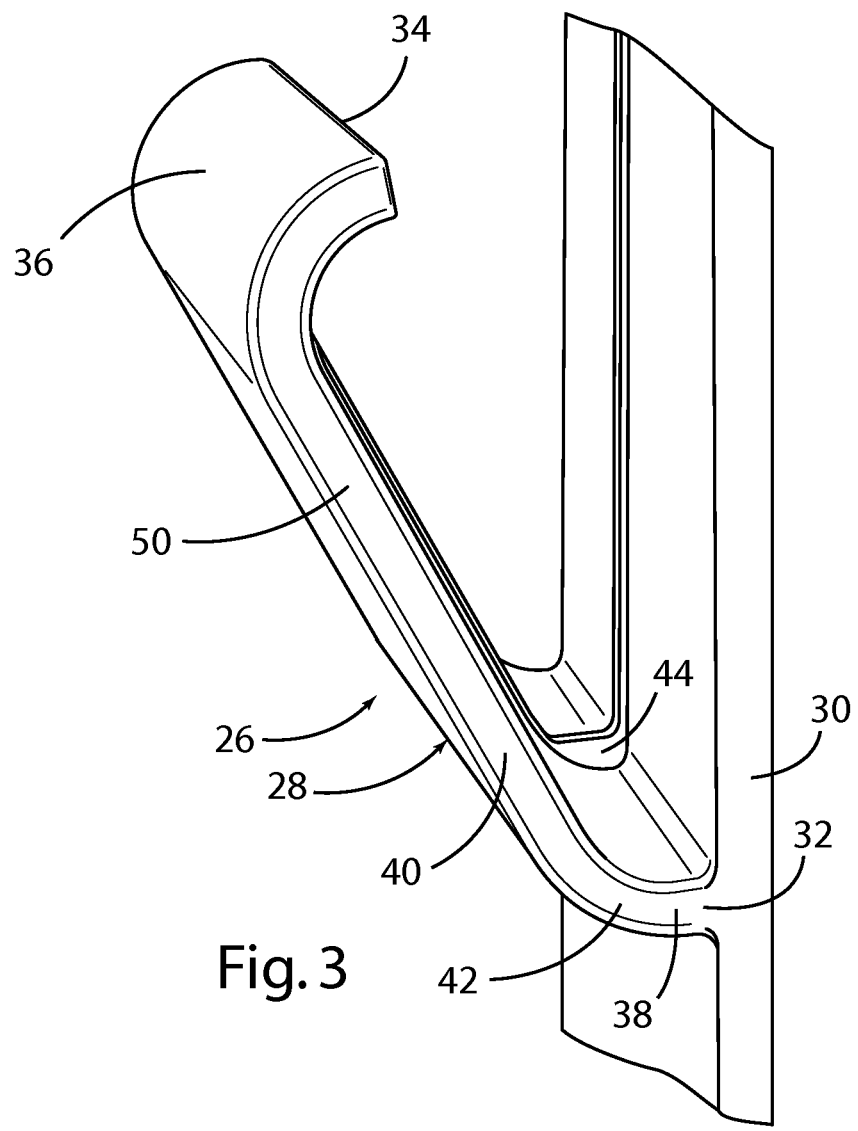
FIG. 3 is an enlarged partial perspective view of a portion of the grille attachment structure as set forth in FIG. 2.

As illustrated in FIG. 3, in the present example the cantilever member 28 has a first section 38 extending generally perpendicular to the sidewall 30 of the grille 10. A second section 40 extends outwardly at an angle to the sidewall 30 of the grille 10 with an arcuate section or bend 42 located between the first section 38 and the second section 40. Accordingly, the overall shape and configuration of the cantilever member 28 may be adjusted to vary its spring stiffness.

In a further example, illustrated in FIG. 3, the cantilever member 28 includes a rib 44. The rib 44 extends between the cantilever member 28 and the sidewall 30 similar to the web portion of an I-Beam. As with the shape and configuration of the cantilevered member 28, the shape and configuration of the rib 44 adjusts to increase or decrease the spring stiffness. For example, the rib 44 may extend longitudinally along the second section 40 of the cantilevered member 28. Instead of being an integral portion of the cantilever member 28 and sidewall 30 the rib 44 can be a separate or member connected either to the cantilever member 28 or sidewall 30.

Figures 5A, 5B:
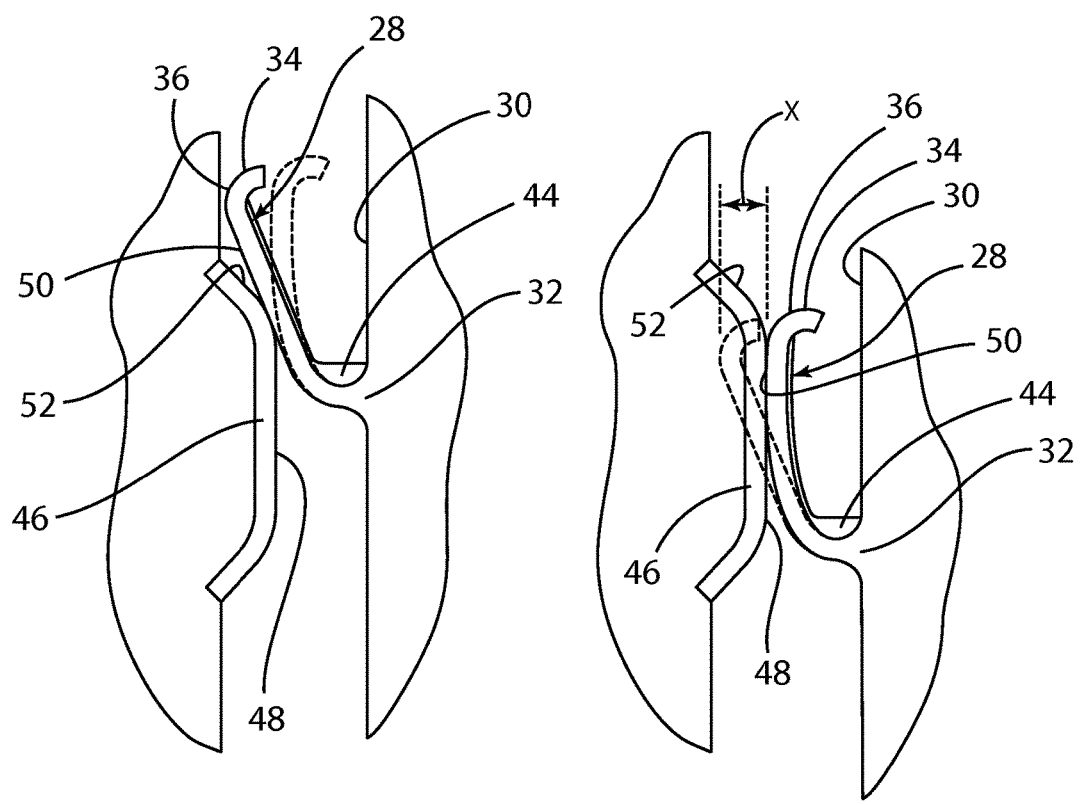
FIG. 5A is an enlarged schematic side view of one example of a spring-like mechanism initially engaging a reaction surface according to the present invention.
FIG. 5B is an enlarged schematic side view of one example of a spring-like mechanism engaging a reaction surface according to the present invention illustrating the interference fit between the spring-like mechanism and the reaction surface.

FIG. 4 illustrates the engagement or contact of the cantilever member 28 with a support plate 46, having a reaction surface 48, located adjacent the grille opening 14, typically near the headlights 16, 18. The cantilever member 28 is designed with a certain amount of interference between the distal or free end 34 of the cantilever member 28 and the reaction surface 48, see FIGS. 5A and 5B illustrating the interference in dotted lines. Accordingly, when the grille 10 is placed in the grille opening 14 the distal or free end 34 of the cantilever member 28 is disposed inwardly, toward the sidewall 30 generating a certain amount of reaction or spring force in the cantilever member 28.

FIGS. 4, 5A and 5B illustrate an example of a vertically installed grille 10 wherein the grille 10 is lowered between the respective headlights 16, 18. In doing so, an engagement face 50 of the cantilevered member 28 engages a beveled guide surface 52 located on the support plate 46 adjacent the reaction surface 48. The guide surface 52 operates to move or compress the distal or free end 34 of the cantilever member 28 inwardly toward the sidewall 30. The cantilever member 28 bows or deflects inwardly until the engagement face 50 engages the reaction surface 48 thereby generating a spring force operative to urge the grille 10 laterally in the grille opening 14 away from the headlight 16 toward the center of the grille opening 14.

As set forth below, one example of the present invention includes the grille 10 having a first and second resilient structure illustrated herein as multiple cantilevered members 28 located on an opposite sidewalls 30. Further, the grille 10 includes first and second reaction surfaces one example thereof being multiple support plates 46 located in the grille opening 14 adjacent the respective headlights 16, 18. Since the cantilever members 28 are located on opposite sidewalls 30 of the grille 10, the interference fit between the respective cantilever members 28 and support plates 46 operates to generate a reaction force that pushes the grille 10 into the center of the opening. The amount of interference depends on the predictive variance of the headlight 16, 18 to grille 10 margin or gap 20, 22.

As set forth below, the reaction force between the spring-like mechanisms 26, shown herein as cantilever members 28, and the support plates 46 is such that even margins 20, 22 on either side of the grille 10 produce an equal amount of reaction force by the spring-like mechanisms 26, keeping the system in equilibrium.

Figure 6:
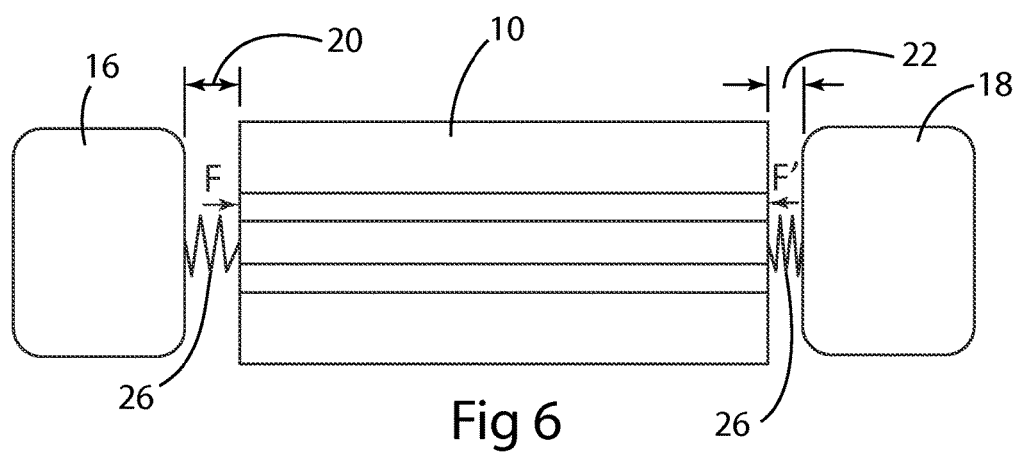
FIG. 6 is a schematic view of the grille attachment structure illustrating the grill offset in the opening and having an uneven margin.

FIG. 6 illustrates a free body schematic for a grille 10 system having a spring-like mechanism 26 operative to push the grille 10 to the center of the grille opening, the open area between the respective headlights 16, 18. Depending on the size and weight of the grille 10, there could be one or more spring-like mechanisms 26 deployed on each side of the grille 10 and acting on corresponding support plates or members located adjacent the respective headlights 16, 18. As illustrated in FIG. 6, when the grille 10 lowered into the grille opening (not shown) between the headlights 16, 18 it is not centered, creating a wide margin or gap 20 adjacent headlight 16 and a narrow margin or gap 22 on the other side of the grille 10 adjacent headlight 18.

Initially, the determination of spring stiffness (k) and amount of interference (X), see FIG. 5B illustrating the inward deflection of the cantilever member 28 from its original position shown in a dotted lines, depends on the inertial force (F) provided by the weight of the grille 10, where $F=kX$. For example, a heavier grille 10 may need both a greater amount of interference (X) to increase the spring force and in addition may require a stiffer spring. As illustrated in FIG. 6, when the grille 10 is off-center, there is a larger interference (X') associated with the narrow margin 22 and a lesser interference (X) associated with the wider margin 20. This results in an unbalanced forces F and F' on each side of the grille 10 wherein $F'=kX+kX'$, where k equals the spring stiffness and kX' is the uneven force generated due to additional compression of the spring-like mechanism 26 caused by the uneven margins 20, 22, specifically the narrow margin 22.

Figure 7:
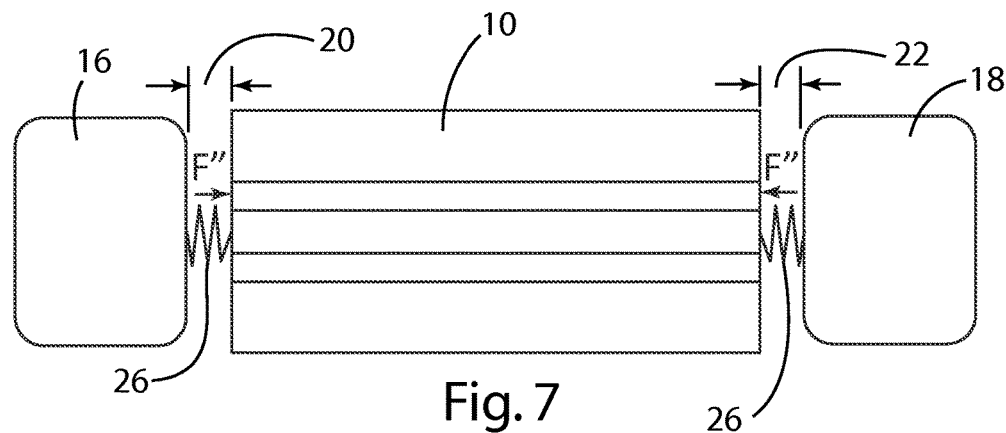
FIG. 7 is a schematic view of the grille attachment structure illustrating the grille in equilibrium and centered in an opening.

The unbalanced forces F and F' on each side of the grille 10 automatically adjust the position of grille 10 in the grille opening 14. Because the force F' is greater than the force F it acts on and shifts the grille 10 laterally until there is an equal amount of interference between the spring-like mechanisms 26 located on opposite sides of the grille 10. FIG. 7 shows the result of an unbalanced force centering the grille 10 between the headlights 16, 18. As illustrated, the grille 10 achieves equilibrium (F″) along with even margins 20, 22 from the left to right hand side headlights 16, 18 when F″=kX+kX″ where X″=X′/2 and is the result of the unbalanced force causing the grille 10 to move laterally or slide in the grille opening 14 until equilibrium is achieved with an equal amount of interference between the opposing spring-like mechanism 26 located adjacent the respective headlights 16, 18. Upon achieving equilibrium, the grille 10 can then be secured to the vehicle 12 using various known means to prevent future displacement. The even margins 20, 22 on either side of the grille 10 produce an equal amount of reaction force by the spring-like mechanisms 26 on either side of the grille 10, keeping the system in equilibrium and the grille equidistant from the respective edges of the grille opening 14.

Additional embodiments of the present invention include the spring-like mechanism 26 being a molded in feature on an inner or outer surface of the grille 10. If molded in features are not possible due to tooling condition, plastic or metal spring clips can be mechanically attached to the grille 10 to deliver the same results.

The disclosed example is for a top loaded grille 10 assembly; that is, the grille 10 is inserted into the grille opening 14 in a vertical manner, from the top down. Accordingly, the spring-like mechanism 26 is oriented in a vertical direction whereby it compresses and correspondingly generates a reaction force upon installation of the grille 10. For a horizontally loaded grille, the spring-like mechanism 26 is oriented in the horizontal direction whereby it compresses and correspondingly generates a reaction force upon installation of the grille 10. In some cases the spring-like mechanism 26 can be part of the grille opening 14 or headlight housings with the support plate 46 and reaction surface 48 being part of the grille 10.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An assembly comprising:
   an automotive vehicle having a grille opening;
   a grille, having first and second opposite sidewalls;
   a first resilient cantilever member located on said first sidewall and a second resilient cantilever member located on said second sidewall;
   said first resilient cantilever member having a proximal end and a distal end, said proximal end connected to said first sidewall and a distal end positioned vertically above said proximal end and spaced from said first sidewall, said first resilient cantilever member including an engagement surface;
   said second resilient cantilever member having a proximal end and a distal end, said proximal end connected to said second sidewall and a distal end positioned vertically above said proximal end and spaced from said second sidewall, said second resilient cantilever member including an engagement surface;
   wherein a load acting on said engagement surface of said first resilient cantilever member deflects said distal end of said first resilient cantilever member inward towards said first side wall and decreases the space between said distal end of said first resilient cantilever member and said first sidewall; and
   wherein a load acting on said engagement surface of said second resilient cantilever member deflects said distal end of said second resilient cantilever member inward towards said second side wall and decreases the space between said distal end of said second resilient cantilever member and said second sidewall.

2. An assembly as set forth in claim 1 wherein at least one of said first resilient cantilever member and said second resilient cantilever member includes a rib.

3. An assembly as set forth in claim 2 wherein said rib has a shape, said shape configured to adjust the stiffness of at least one of said first resilient cantilever member and said second resilient cantilever member.

4. An assembly as set forth in claim 1 wherein said grille opening includes a plurality of support plates located about a peripheral edge thereof; and
   said first resilient member contacting one of said support plates and said second resilient member contacting one of said support plates.

5. An assembly as set forth in claim 1 wherein said first resilient cantilever member includes a first section connected to and extending generally perpendicular to said first sidewall and a second section extending outwardly at an angle to the first sidewall; and
   said second resilient cantilever member includes a first section connected to and extending generally perpendicular to said second sidewall and a second section extending outwardly at an angle to the second sidewall.

6. An assembly as set forth in claim 1 wherein said first resilient cantilever member includes a rib extending between said first resilient cantilever member and said first sidewall; and
   said second resilient cantilever member includes a rib extending between said second resilient cantilever member and said second sidewall.

* * * * *